(12) United States Patent
Bass

(10) Patent No.: US 7,453,896 B1
(45) Date of Patent: Nov. 18, 2008

(54) METHOD AND APPARATUS FOR LONGITUDINAL BALANCE CALIBRATION

(75) Inventor: Eric Bass, Austin, TX (US)

(73) Assignee: ZARLINK Semiconductor, Ottawa, ON (CA)

( * ) Notice: Subject to any disclaimer, the term of this patent is extended or adjusted under 35 U.S.C. 154(b) by 719 days.

(21) Appl. No.: 10/717,365

(22) Filed: Nov. 19, 2003

(51) Int. Cl.
*H04M 1/00* (2006.01)

(52) U.S. Cl. ..................................... 370/403

(58) Field of Classification Search .................. 379/403
See application file for complete search history.

(56) References Cited

U.S. PATENT DOCUMENTS

| | | | | |
|---|---|---|---|---|
| 4,431,874 | A * | 2/1984 | Zobel et al. | 379/405 |
| 4,620,069 | A * | 10/1986 | Godwin et al. | 379/22.02 |
| 4,910,768 | A * | 3/1990 | Sues et al. | 379/394 |
| 5,436,953 | A * | 7/1995 | Nilson | 379/27.01 |
| 6,724,880 | B1 * | 4/2004 | Lynch | 379/219 |
| 2002/0159548 | A1 * | 10/2002 | Evans et al. | 375/346 |
| 2003/0076945 | A1 * | 4/2003 | Huang et al. | 379/387.01 |
| 2007/0003052 | A1 * | 1/2007 | Hein et al. | 379/399.01 |

OTHER PUBLICATIONS

Apfel et al, "Signal Processing Chips Enrich Telephone Line-Card Architecture"; Electronics; May 5, 1982; pp. 113-118.*

Grandstaff, O. D. ; "Longitudinal Balance Measurement of Central Office Equipment", IEEE Trans. on Communications, vol. 20, No. 3, Jun. 1972; pp. 382-391.*
IEEE Standard: "Test Procedures for Measuring Longitudinal Balance of telephone Equipment Operating in the Voice Band"; ANS/IEEE Std 455-1985 [Whole document].*
Grandstaff, "Longitudinal Balance Measurement of Central Office Equipment", IEEE Tran. On Comm. vol. COM-20, No. 3, Jun. 1972, pp. 382-391].*
IEEE Standard Test Procedures for Measuring Longitudinal Balance [ANS/IEEE Std 455-1985]; Pub: Jul. 25, 1985.*

* cited by examiner

*Primary Examiner*—Ramnandan Singh
(74) *Attorney, Agent, or Firm*—Williams, Morgan & Amerson, P.C.

(57) ABSTRACT

A method and apparatus is provided for performing longitudinal balance calibration. A differential signal is provided. A calibration of a gain of at least a portion of the differential signal to affect the longitudinal balance associated with the differential signal. Performing the calibration includes: receiving a first portion of the differential signal and determining a gain associated with the first portion; receiving a second portion of the differential signal and determining a gain associated with the second portion; determining a difference between the respective gains of the first and second portions to determine whether the difference is outside a predetermined range of tolerance; and modifying at least of the gain of the first portion and the gain of the second portion based upon a determination that the difference is outside the predetermined range of tolerance.

30 Claims, 7 Drawing Sheets

METHOD AND APPARATUS FOR LONGITUDINAL BALANCE CALIBRATION

BACKGROUND OF THE INVENTION

1. Field of the Invention

This invention relates generally to telecommunications, and, more particularly, to performing a calibration to improve longitudinal balance in a circuit.

2. Description of the Related Art

In communications systems, particularly telephony such as a Plain Old Telephone System (POTS), it is common practice to transmit signals between a subscriber station and a central switching office via a two-wire, bi-directional communication channel. A line card generally connects the subscriber station to the central switching office. The functions of the line card include supplying talk battery, performing wake-up sequences of circuits to allow communications to take place, and the like. Voltage signals are processed and conditioned when being driven onto telecommunication lines.

POTS was designed primarily for voice communication, and thus provides an inadequate data transmission rate for many modern applications. To meet the demand for high-speed communication, designers have sought innovative and cost-effective solutions that would take advantage of the existing network infrastructure. Several technological solutions proposed in the telecommunications industry use the existing network of telephone wires. A promising one of these technologies is the Digital Subscriber Line (xDSL or DSL) technology.

xDSL is making the existing network of telephone lines more robust and versatile. Once considered virtually unusable for broadband communications, an ordinary twisted pair equipped with DSL interfaces can transmit video, television, and very high-speed data. The fact that more than six hundred million telephone lines exist around the world is a compelling reason for these lines to be used as the primary transmission conduits for at least several more decades. Because DSL utilizes telephone wiring already installed in virtually every home and business in the world, it has been embraced by many as one of the more promising and viable options.

There are now at least three popular versions of DSL technology, namely Asymmetrical Digital Subscriber Line (ADSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL and POTS technologies can co-exist in one line (e.g., also referred to as a "subscriber line"). Traditional analog voice band interfaces use the same frequency band, 0-4 Kilohertz (KHz), as telephone service, thereby preventing concurrent voice and data use. A DSL interface, on the other hand, operates at frequencies above the voice channels, from 25 KHz to 1.1 Megahertz (MHz). Thus, a single DSL line is capable of offering simultaneous channels for voice and data. It should be noted that the standards for certain derivatives of ADSL are still in definition as of this writing, and therefore are subject to change.

DSL systems use digital signal processing (DSP) to increase throughput and signal quality through common copper telephone wire. It provides a downstream data transfer rate from the DSL Point-of-Presence (POP) to the subscriber location at speeds of up to 1.5 megabits per second (MBPS). The transfer rate of 1.5 MBPS, for instance, is fifty times faster than a conventional 28.8 kilobits per second (KBPS) transfer rate typically found in conventional POTS systems.

DSL systems generally employ a signal detection system that monitors the telephone line for communication requests. More specifically, the line card in the central office polls the telephone line to detect any communication requests from a DSL data transceiver, such as a DSL modem, located at a subscriber station. There are multiple types of signals that are received and transmitted over multiple signal paths during telecommunication operation. Many times, feedback configurations in the amplifiers that process the transmission signals cause noise and power problems.

Many of today's amplifier circuits may call for electronic components that have high bandwidth, which may increase consumption of power. Many times, power consumption in the line card can become undesirably high. Amplifier circuits that are used to condition communication signals often consume large amounts of power. Excessive power use can compromise the effectiveness of line cards, particularly for remote line cards, which rely upon portable power supplies. Excessive power consumption can also require additional resources to counteract the effects of high power consumption, such as additional cooling systems to keep line card circuitry in operating condition. Excessive power consumption can also require additional circuits to furnish the required amounts of power needed for efficient operation of line cards. Excessive power consumption can cause appreciable inefficiencies in the operation of line cards and the communication system as a whole.

The prior art implementations of signal conditioning circuits generally implement signal feedback configurations that generally take the output voltage signal and then feed the voltage signal back to a negative input of an amplifier within a circuit. In other words, the direct output voltage signal is the feedback signal used in the implementations described above. Among the problems associated with the current implementations, include the fact that a larger signal is fed back into the circuit described above. The problem with such an implementation is that larger signals may generally carry larger amounts of noise. Therefore, feeding back larger signals amounts to feeding back larger amounts of noise into the circuit, which may cause performance problems in the amplifier circuit.

Additionally, feeding back the output voltage signal may require amplifiers that have relatively large bandwidth capabilities. Utilizing amplifiers with larger bandwidth capabilities generally increases power consumption. Additionally, many prior art systems employ feedback configurations that use single-ended feedback signals. The circuits that use these types of configurations may experience an excessive amount of longitudinal signals, such as longitudinal currents. Longitudinal signals may enter one or more amplification stages within a circuit and cause excessive noise. Utilizing the current methodologies, the performance of a signal conditioning circuit may be compromised.

Often, longitudinal imbalance may occur in circuits that employ multiple signals or differential-type amplifiers. For example, telecommunication signals generally comprise a ring signal and a tip signal. The forward paths of the tip and ring signals may contain longitudinal imbalance that may cause signal degradation or errors in telecommunications. Longitudinal balance may be dominated by the differential gain between the tip and ring forward paths. The common mode error that exists on the differential-type circuits can cause significant errors in telecommunications.

The present invention is directed to overcoming, or at least reducing the effects of, one or more of the problems set forth above.

SUMMARY OF THE INVENTION

In one aspect of the present invention, a method is provided for performing longitudinal balance calibration. A differential signal is provided. A calibration of a gain of at least a portion of the differential signal to affect the longitudinal balance associated with the differential signal. Performing the calibration includes: receiving a first portion of the differential signal and determining a gain associated with the first portion; receiving a second portion of the differential signal and determining a gain associated with the second portion; determining a difference between the respective gains of the first and second portions to determine whether the difference is outside a predetermined range of tolerance; and modifying at least of the gain of the first portion and the gain of the second portion based upon a determination that the difference is difference is outside the predetermined range of tolerance.

In another aspect of the present invention, an apparatus is provided for performing longitudinal balance calibration. The apparatus of the present invention includes a first amplifier adapted to buffer a first portion of a differential signal and a second amplifier to buffer a second portion of the differential signal to generate a differential output signal. The apparatus also includes a calibration unit adapted to determine a difference between the gain of the first portion of the differential output signal and a second portion of the differential output signal. The calibration unit is also adapted to adjust at least one of a gain associated with the first portion of the differential output signal and a gain associated with the second portion of the differential output signal based upon the difference to affect a longitudinal balance.

In another aspect of the present invention, a system is provided for performing longitudinal balance calibration. The system of the present invention includes a subscriber line and a line card. The line card is electronically coupled with the subscriber line. The line card is adapted to provide a differential signal and to perform a calibration of a gain of at least a portion of the differential signal to affect the longitudinal balance associated with the differential signal. Performing the calibration includes: receiving a first portion of the differential signal and determining a gain associated with the first portion; receiving a second portion of the differential signal and determining a gain associated with the second portion; determining a difference between the respective gains of the first and second portions to determine whether the difference is outside a predetermined range of tolerance; and modifying at least of the gain of the first portion and the gain of the second portion based upon a determination that the difference is difference is outside the predetermined range of tolerance.

BRIEF DESCRIPTION OF THE DRAWINGS

The invention may be understood by reference to the following description taken in conjunction with the accompanying drawings, in which like reference numerals identify like elements, and in which.

Figure 1:
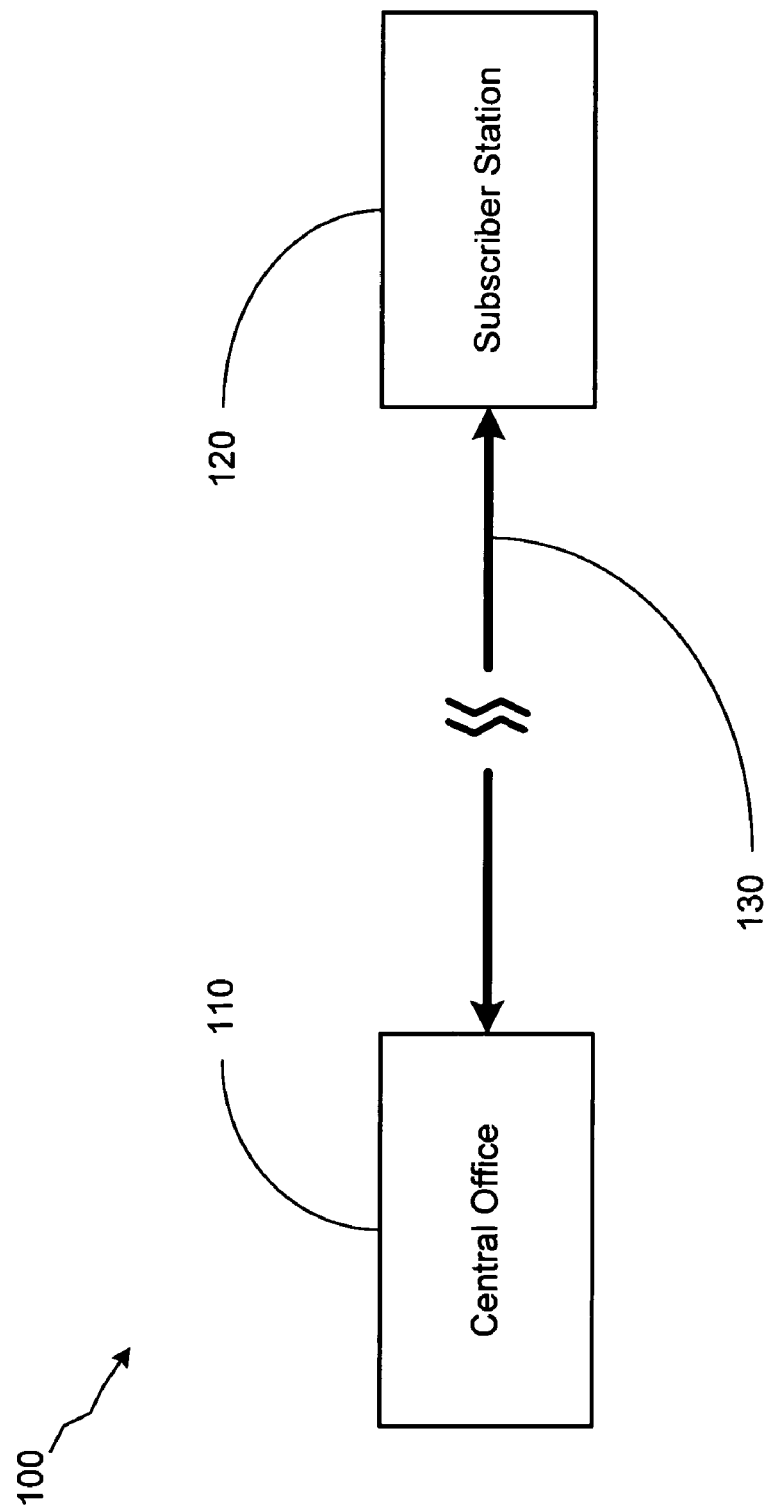
FIG. 1 illustrates a first embodiment of an apparatus in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for promoting longitudinal balance in a differential-type circuit. Telecommunication circuits may comprise various differential signals, such as tip and ring signals. Common mode rejection ratios in the differential-type circuits in telecommunication devices may be of interest when reducing errors and maintaining signal integrity. Longitudinal balance may be affected by the differential gain between various signals, such as the tip and ring signals. Embodiments of the present invention provide for performing a calibration function to reduce errors and improve longitudinal balance between various signals in a telecommunication device. The calibration procedure provided by embodiments of the present invention may include employing an external load and measuring gains of various signals, such as the tip and ring signals. Embodiments of the present invention then provide for performing a correction procedure, which may be used to adjust the gains of various signals, such as the tip and ring signals, to reduce the difference in the differential gain between the signals to improve longitudinal balance.

Referring now to the drawings and in particular to FIG. 1, an apparatus 100 in accordance with the present invention is illustrated. The apparatus 100 includes a central office 110 that is coupled to a subscriber station 120 via a subscriber line 130. The central office 110 and the subscriber station 120 are capable of sending and receiving a signal comprising a voice and data band. The voice band, as used herein, refers to a POTS voice signal ranging from 0-4 KHz. The data band refers to frequencies above the voice band, and may include, for example, the frequency range employed in xDSL technologies. In one embodiment, the subscriber line 130 may be a Public Switched Telephone Network (PSTN) line, a Private Branch Exchange (PBX) line, or any other medium capable of transmitting signals.

The subscriber station 120 may be a telephonic device capable of supporting pulse dialing. The term "telephonic device," as utilized herein, includes a telephone, or any other device capable of providing a communication link between at least two users. In one embodiment, the subscriber station 120 may be one of a variety of available conventional telephones, such as wired telephones and similar devices. In an alternative embodiment, the subscriber station 120 may be any "device" capable of performing a substantially equivalent function of a conventional telephone, which may include, but is not limited to, transmitting and/or receiving voice and data signals. Examples of the subscriber station 120 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
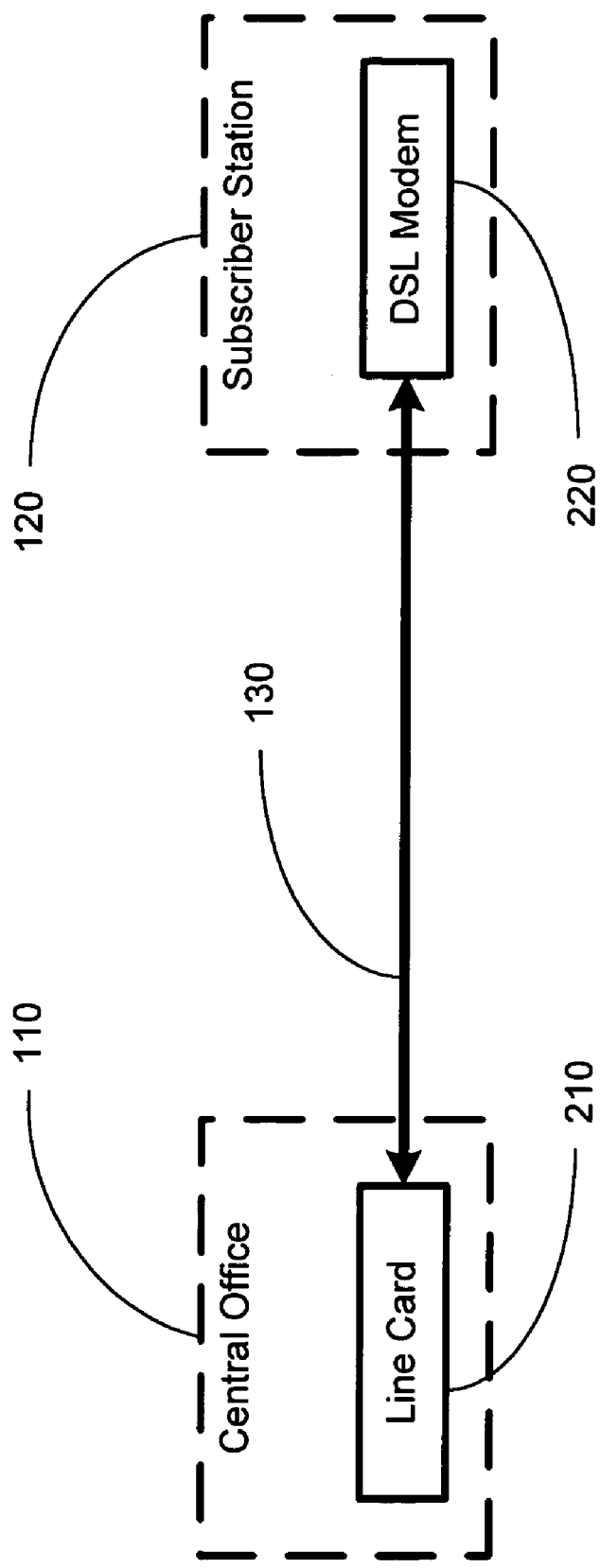
FIG. 2 illustrates an implementation of a line card into the apparatus described in FIG. 1 in accordance with one illustrative embodiment of the present invention.

Turning now to FIG. 2, a line card 210 and a DSL modem 220 are illustrated in accordance with the present invention. In one embodiment, the line card 210, which is integrated into the central office 110, is coupled with the DSL modem 220, which resides within the subscriber station 120. Because voice and/or data can be transmitted on the subscriber line 130, the signal received and transmitted by the line card 210 and the DSL modem 220 may include voice and data band frequencies.

The line card 210 may be located at a central office 110 or a remote location somewhere between the central office 110 and the subscriber station 120 (see FIG. 1). The line card 210 services the subscriber station 120, which in the illustrated embodiment is a telephonic device. The line card 210 is capable of processing DC voltage signals and AC signals. The subscriber line 130 in the instant embodiment is a telephone line. The combination of the telephone device (subscriber station 120) and the telephone line (subscriber line 130) is generally referred to as a subscriber loop.

The line card 210, which may be capable of supporting a plurality of subscriber lines 130, performs, among other things, two fundamental functions: DC loop supervision and DC feed. The purpose of DC feed is to supply enough power to operate the subscriber station 120 at the customer end. The purpose of DC loop supervision is to detect changes in DC load, such as on-hook events, off-hook events, rotary dialing, or any other event that cause the DC load to change. In the interest of clarity and to avoid obscuring the invention, only that portion of the line card 210 that is helpful to an understanding of the invention is illustrated.

Figure 3:
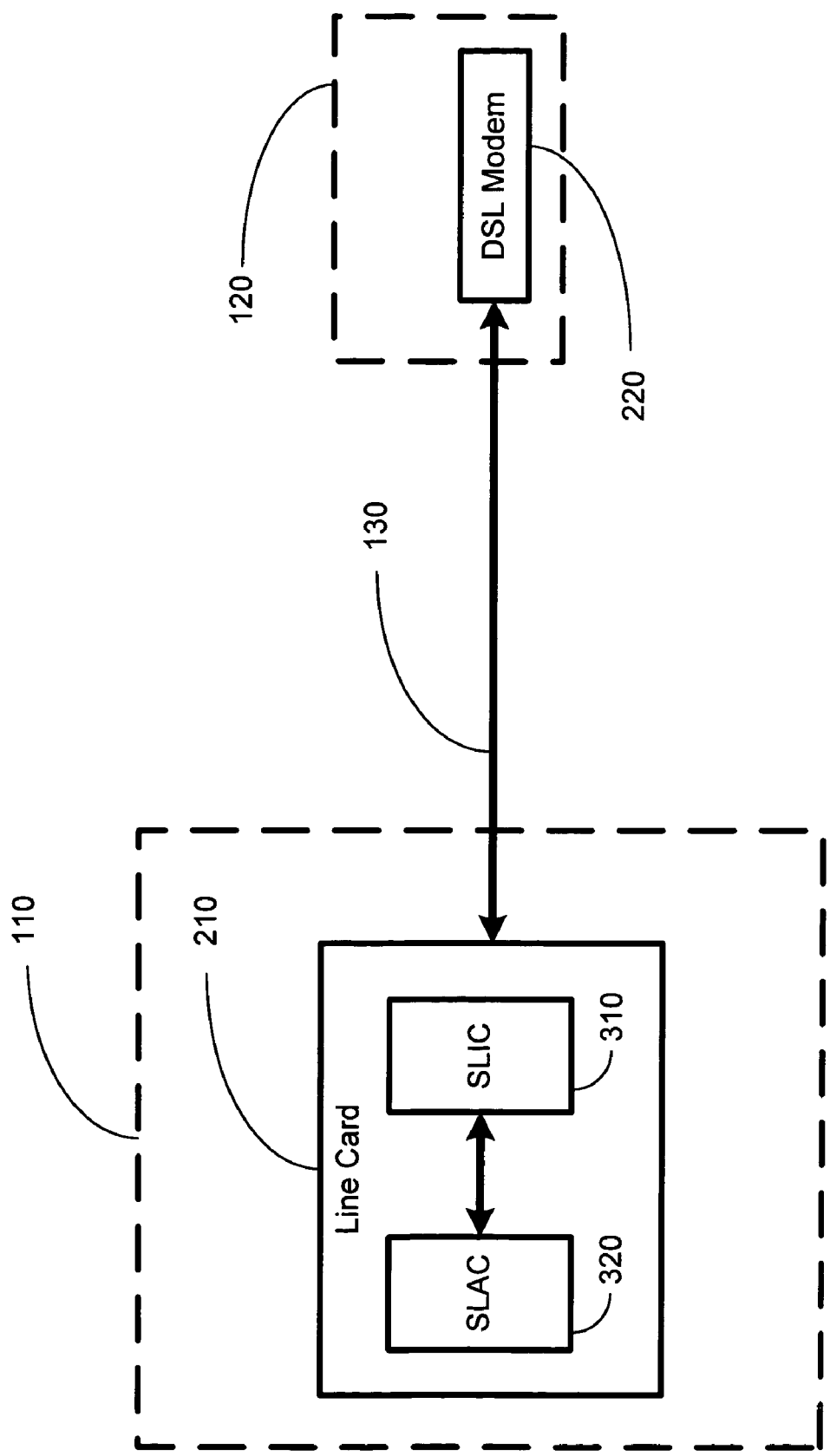
FIG. 3 illustrates a more detailed depiction of the line card in accordance with one illustrative embodiment of the present invention.

Turning now to FIG. 3, one embodiment of the line card 210 is illustrated. In one embodiment, the line card 210 comprises a subscriber line interface circuit (SLIC) 310 as well as a subscriber line audio-processing circuit (SLAC) 320. The SLIC 310 performs a variety of interface functions between the line card 210 and the subscriber line 130. The SLIC 310 is also capable of performing a variety of functions, such as battery feed, overload protection, polarity reversal, on-hook transmission, and current limiting. The SLIC 310 is connected to the SLAC 320. The SLAC 320 is capable of processing analog-to-digital (A/D) and digital-to-analog (D/A) signal conversion, filtering, feed control, and supervision.

Figure 4:
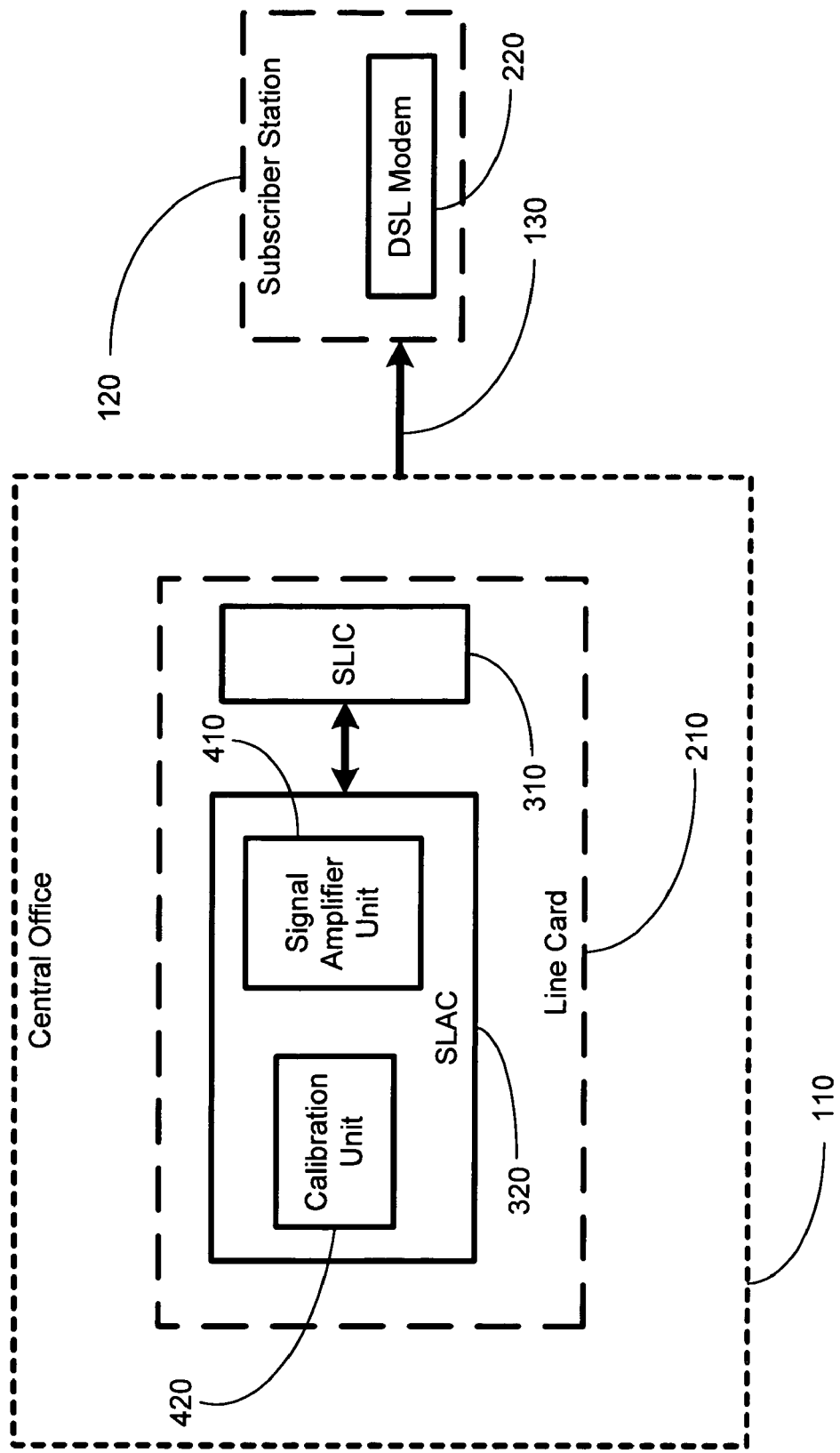
FIG. 4 illustrates a simplified block diagram depiction of a SLAC described in FIG. 3, in accordance with one illustrative embodiment of the present invention.

Turning now to FIG. 4, a more detailed description of the line card 210 in accordance with one embodiment of the present invention is illustrated. As shown in FIG. 4, the SLAC 320 may comprise a signal amplifier unit 410 and a calibration unit 420. The calibration unit 420 is capable of detecting a signal on various sense leads from the SLIC 310 and adjusting the various gains associated with various amplifiers that may be implemented into the signal amplifier unit 410. The sense leads from the SLIC 310 may include a feedback ring signal and a feedback tip signal, which may result from implementing a test load on the SLIC 310. One implementation of the test load is provided in FIG. 6 and accompanying description below.

Based upon feedback signals from the SLIC 310, the calibration unit 420 is capable of performing calibration adjustments to the signal amplifier unit 410 to improve longitudinal balance. A more detailed description of one embodiment of the calibration unit 420 and the signal amplifier unit 410 is provided in FIG. 5 and accompanying description below. In one embodiment, the calibration unit 420 may calibrate various amplifiers in the signal amplifier unit 410 based upon signals from various portions of the telecommunications system 100. In other words, the SLIC 310 and the SLAC 320, which contain amplifiers and signals that may be calibrated, may be present on a single device or may be present on various devices within the system 100. In one embodiment, the calibration adjustments provided by embodiments of the present invention may relate to a system-wide calibration of various differential signals. In alternative embodiments, the calibration adjustments provided by embodiments of the present invention may relate to calibration of a single device.

Figure 5:
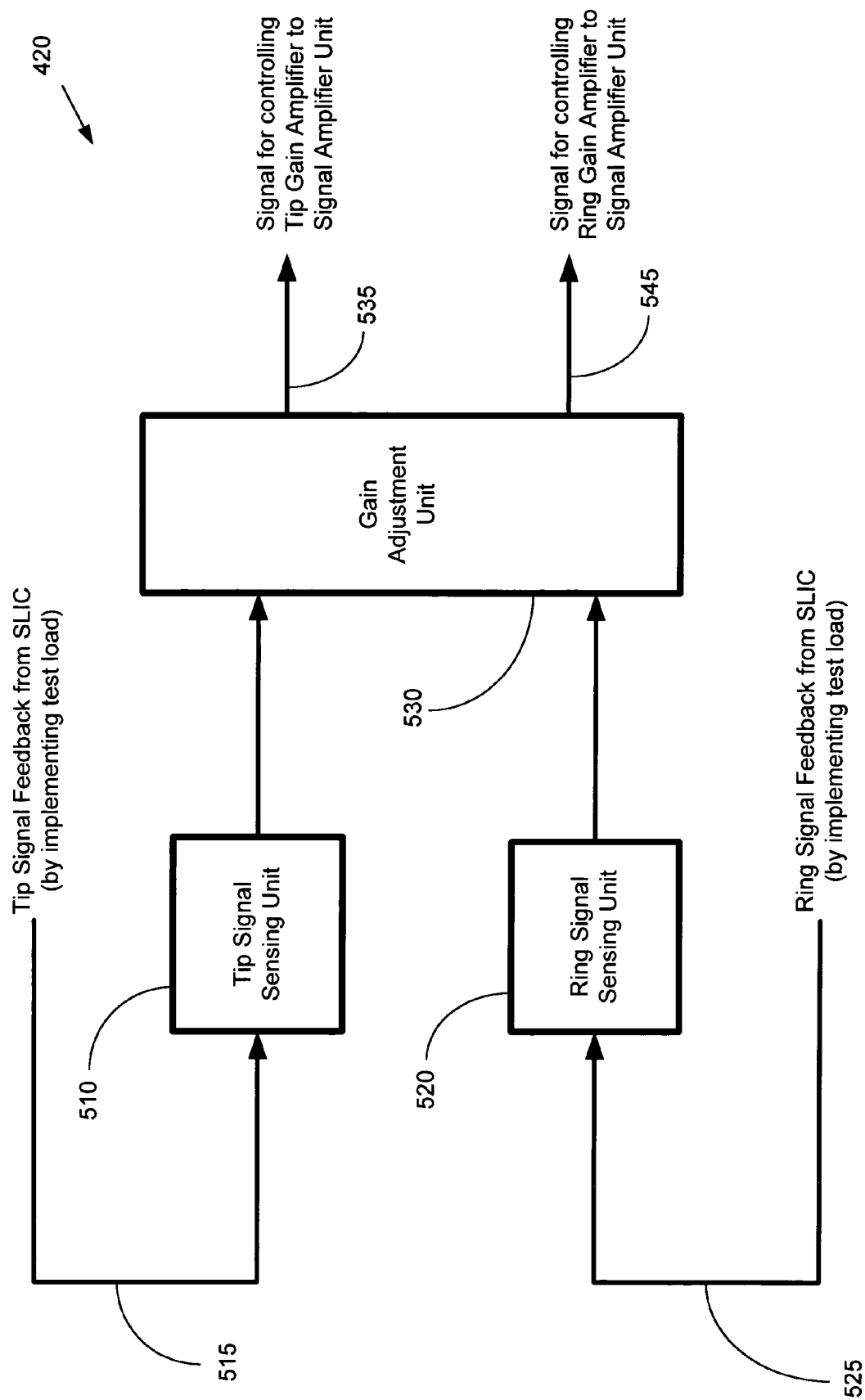
FIG. 5 illustrates a block diagram depiction of a calibration unit in the SLAC of FIG. 4, in accordance with one illustrative embodiment of the present invention.

Turning now to FIG. 5, a block diagram depiction of one embodiment of the calibration unit 420 is illustrated. In one embodiment, the calibration unit 420 may comprise a tip signal sensing unit 510, a ring signal sensing unit 520, and a gain adjustment unit 530. The tip signal sensing unit 510 and the ring signal sensing unit 520 may comprise various circuits known to those skilled in the art having benefit of the present disclosure that are capable of sensing the signal on a sense lead to determine whether a difference exists.

The calibration unit 420 may receive feedback signals on a line 515 and a line 525 from the SLIC 310. In one embodiment, the lines 515 and 525 are sense leads that are received from the SLIC 310. The feedback signals on the lines 515 and 525 received from the SLIC 310 may also be the result of a test load that is implemented on the output of the SLIC 310, which may be used to determine the differential gain experienced by the tip and ring signal forward paths. The tip signal sensing unit 510 may receive a tip signal feedback signal on a line 515 from the SLIC 310. The tip signal sensing unit 510 may be capable of determining the gain experienced by the tip signal forward path based upon processing of the tip signal feedback signal on the line 515.

Similarly, the ring signal sensing unit 520 may receive a ring signal feedback from the SLIC 310 on the line 525. The ring signal sensing unit 520 is capable of determining the gain experienced by the ring signal forward path. The ring signal sensing unit 520 is capable of determining the gain of the ring signal forward path based upon processing of the ring signal feedback signal on the line 515. Data from the tip signal sensing unit 510 and the ring signal sensing unit 520 is sent to the gain adjustment unit 530. The gain adjustment unit 530 is capable of detecting the difference in the differential gain between the tip forward path and the ring forward path. Based upon the data from the tip signal sensing unit 510 and the ring signal sensing unit 520 the gain adjustment unit 530 determines an amount of difference in the differential gain between the tip and ring forward paths. As described above, the longitudinal balance of the tip and ring signals is generally proportional to the differential gain between the tip and ring forward paths.

Upon determining the amount of difference in the differential gain between the tip and ring forward paths, the gain adjustment unit 530 is capable of providing a first signal for controlling an amplifier, which provides a gain of the tip signal, on a line 535. Additionally, the gain adjustment unit 530 is capable of providing a second signal for controlling an amplifier, which provides a gain of the ring signal, on a line 545. The signals on the lines 535 and 545 are sent to the signal amplifier unit 410, which performs amplifying functions upon the tip and ring signals.

The signals provided by the gain adjustment unit 530 on the lines 535 and 545 provide the data that may be used to reduce the relative difference between the differential gain between the tip and ring forward paths. For example, if the ring forward path experiences a larger gain as compared to the tip forward path, the gain adjustment unit 530 may reduce the gain provided by the signal amplifier unit 410 by controlling the signal on the line 545, e.g., reducing the gain of the amplifier that provides the gain for the ring signal. Alternatively, the gain adjustment unit 530 may increase the gain of the amplifier that provides the gain for the tip signal provided by the signal amplifier unit 410 by controlling the signal on the line 535. In yet another embodiment, the gain adjustment unit 530 may perform a combination of reducing the gain of the amplifier that provides the gain for the ring signal and increasing the gain of the amplifier that provides the gain for the tip signal provided by the signal amplifier unit 410. By adjusting the signals on the line 535 and/or 545, the gain adjustment unit 530 may be able to reduce the difference in the differential gain between the tip and ring forward paths, thereby reducing the longitudinal imbalance in the system 100 as a whole.

Figure 6:
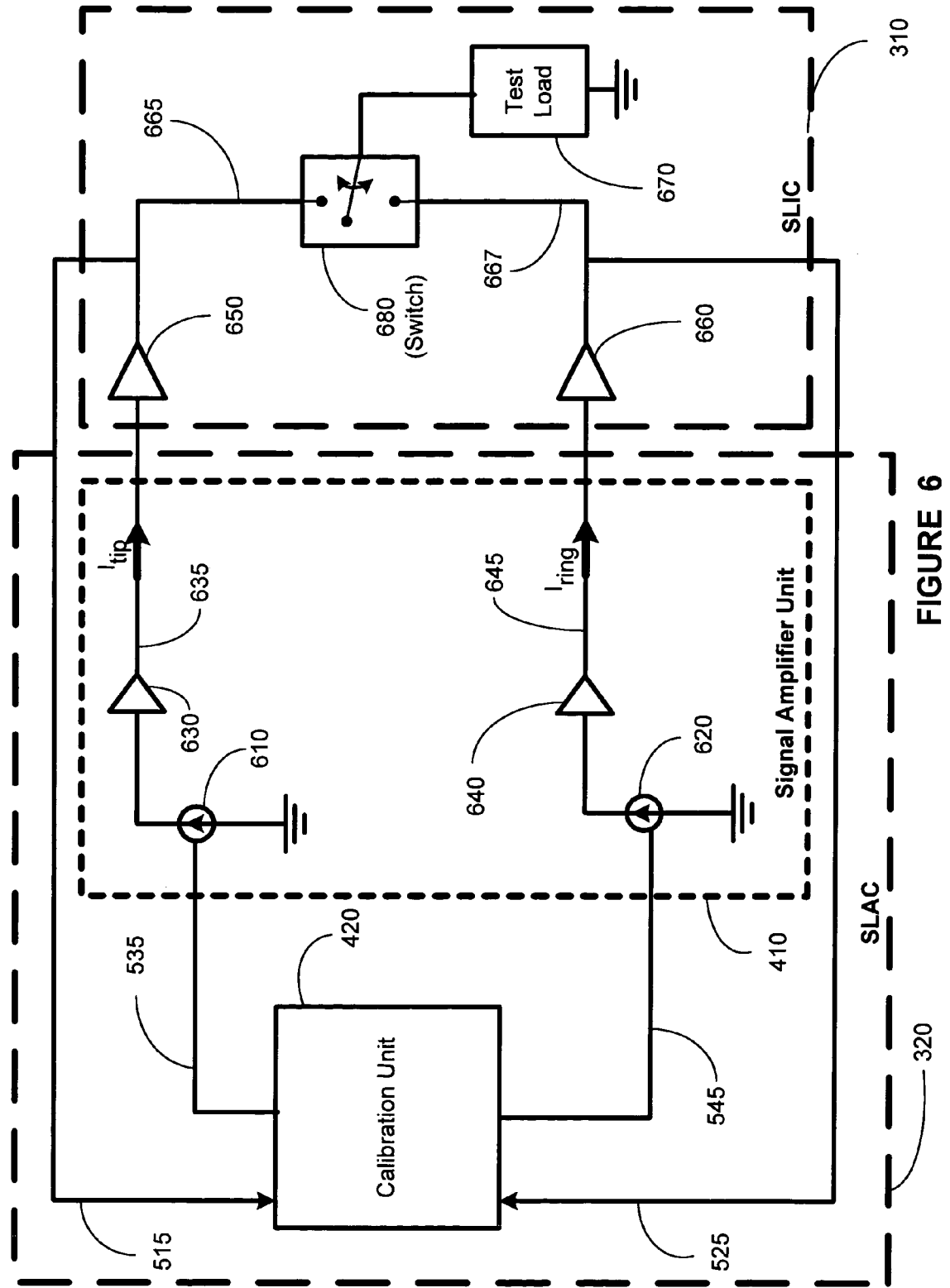
FIG. 6 illustrates a circuit diagram of a signal amplifier unit in the SLAC of FIG. 4, in accordance with one illustrative embodiment of the present invention.

Turning now to FIG. 6, a more detailed description of the signal amplifier unit 410 and the implementation of the test load described above are illustrated. As illustrated in FIG. 6, the calibration unit 420 is capable of providing signals on the line 535 and 545 to control various amplifiers in the signal amplifier unit 410. The signal amplifier unit 410 may comprise a SLAC ring amplifier 640 and a SLAC tip amplifier 630. The SLAC tip amplifier 630 may be fed by a current source 610 and the SLAC ring amplifier 640 may be fed by a current source 620. In one embodiment, the calibration unit 420 provides the signal on the line 535 to adjust the current source 610, which affects the gain of the SLAC tip amplifier 630. Similarly, the calibration unit 420 provides the signal on the line 545 that may be used to control the output of the current source 620, which affects the gain of the SLAC ring amplifier 640.

Therefore, using the signals on the lines 535 and 545, the calibration unit 420 is capable of controlling gain of the SLAC tip and SLAC ring amplifiers 630, 640, the output of which are sent to the SLIC 310. The output of the SLAC tip amplifier 630 is a tip current ($I_{tip}$) provided on a line 635 and is sent to the SLIC 310. The output of the SLAC ring amplifier 640 provides a ring current signal ($I_{ring}$) on a line 645. The $I_{tip}$ and the $I_{ring}$ signals on the lines 635 and 645, respectively, are sent to the SLIC 310.

As shown in FIG. 6, the SLIC 310 may comprise a SLIC tip amplifier 650, which is capable of providing a differential gain upon the signal, $I_{tip}$ to provide a tip forward path on a line 665. The SLIC 310 may also comprise a SLIC ring amplifier 660, which performs a differential gain upon the signal, $I_{ring}$ on the line 645. The output terminal of the amplifier 660 forms a ring forward path on a line 667. The output terminal of the amplifier 650 forms a tip forward path on a line 665.

A test load 670 is provided in order to evaluate the differential gain of the amplifiers 650 and 660, the gain experienced by the tip forward path and the ring forward path on the lines 665, 667, respectively. The test load 670 may comprise various impedance devices, which may comprise passive devices, active devices, or a combination thereof, any of which may be used to provide predetermined impedances. In one embodiment, the test load 670 may comprise a resistor, which is implemented by the operation of a switch 680. In one embodiment, the switch 680 may provide a connection to the output terminal of the amplifier 650 to connect the tip forward path on the line 665 to the test load 670. In one orientation, the tip forward path on the line 665 is coupled to a first terminal of the switch 680 and a second terminal of the test load 670 may be connected to ground.

Likewise, the switch 680 may provide a connection from the amplifier 660, hence, the ring forward path on the line 667 may be coupled to the test load 670. In this orientation, the ring forward path on the line 667 is coupled to a first terminal of the switch 680 and a second terminal of the test load 670 may be connected to ground. Utilizing the switching of the test load 670, the gain of the tip forward path on the line 665 and the ring forward path on the line 667 may be processed for performing calibration adjustments. The tip forward path on the line 665 and the ring forward path on the line 667 are fed back from the SLIC 310 to the calibration unit 420 in the SLAC 320.

In some embodiments, the calibration unit 420 may be placed on the same device or on multiple devices in alternative embodiments, wherein the calibration unit 420 may provide a system-wide type calibration of various differential signals, such as the ring and tip forward paths. By controlling the test load 670 using the switch 680, a relative difference in the respective gains experienced by the tip and ring forward paths 665, 667 may be determined. This information may be used to perform a calibration adjustment to various amplifiers that affect the gain experienced by the tip and ring forward paths 665 and 667. Utilizing the circuitry illustrated in FIG. 6, a local or a system-wide calibration may be performed on a variety of differential signals, e.g., the tip and ring signals.

Figure 7:
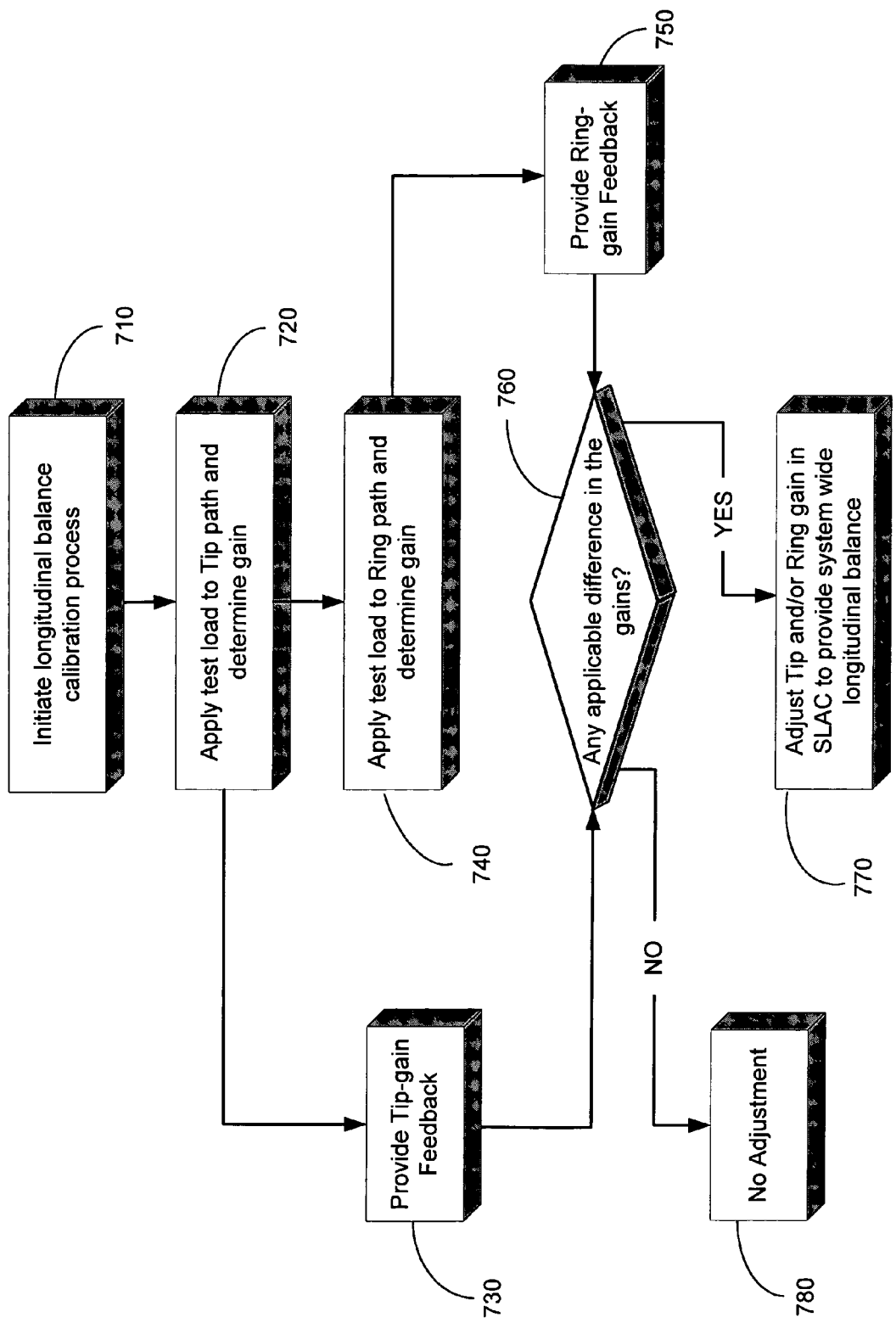
FIG. 7 illustrates a flowchart depiction of a method in accordance with one illustrative embodiment of the present invention.

Turning now to FIG. 7, a flow chart depiction of the method in accordance with embodiments of the present invention is illustrated. The system 100 may initiate a longitudinal balance calibration process that begins a process of determining various differential gains to perform calibration adjustments to improve longitudinal balance (block 710). The system 100 may then apply a test load 670 to the tip forward path on the line 665 to determine a differential gain of the tip forward path on the line 665 (block 720). Upon applying the test load 670, the system 100 may provide a tip gain feedback signal to a calibration unit 420 located at various points of the system 100 to affect the overall system-wide longitudinal balance of the system 100 (block 730).

The system 100 may also apply the test load 670 to the ring forward path (on the line 667) to determine the gain experienced by the ring forward path on the line 667 (block 740).

The system 100 may then provide a ring gain feedback signal to the calibration unit 420 for performing calibration adjustments of the gain experienced by the ring gain forward path on the line 667 (block 750). The system 100 may then determine whether there are any appreciable differences in the differential gains between the tip and ring forward paths (on the lines 665 and 667, respectively) (block 760). In other words, the system 100 determines whether the difference in the differential gain between the tip and ring forward paths may be high enough to implement adjustments of various amplifiers associated with the system 100. By calibrating the amplifiers associated with the tip and/or ring signal, the overall longitudinal imbalance of the system 100 may be reduced. Therefore, the calibration adjustments provided by embodiments of the present invention may be used to reduce the longitudinal imbalance in a circuit or to reduce longitudinal imbalance and provide improved telecommunication signal processing performed by the system 100.

The appreciable difference in the gains determined by the system 100 may be a predetermined tolerance range that may be adjusted for the specific type of circuitry or telecommunication signals that are implemented by the system 100. When the system 100 determines that there are no appreciable differences in the relative gains of the ring and tip forward paths, the system 100 will generally not perform any adjustments to the gain of the tip and ring signals (block 780). The system may continue to periodically monitor the relative difference of the tip and ring gain to maintain acceptable longitudinal balance of the system 100.

When the system 100 determines that there may be appreciable differences in the relative gains between the tip and ring forward paths (on the lines 665 and 667, respectively), the system 100 may perform a calibration adjustment to reduce the longitudinal imbalance experienced by the system 100 (block 770). The system 100 may adjust the tip and/or ring gain in the SLAC 320 to provide system-wide longitudinal balance in response to determining that there are appreciable differences in the differential gain between the tip and ring forward paths (on the lines 665 and 667, respectively). Adjustments may be made to the tip gain by modifying the gain of the SLAC tip amplifier 630. Adjustments may also be made to the SLAC ring amplifier 640 to modify the ring gain. Alternatively, the system 100 may adjust the gains of both the SLAC tip amplifier 630 and the SLAC ring amplifier 640 to adjust both of the respective gains of the tip and ring signals in the SLAC 320. Upon adjusting the amplifiers 630, 640 associated with the tip path and/or the ring path, the difference of the differential gain between the tip and ring forward paths may be reduced, thereby improving longitudinal balance of the system 100.

Utilizing embodiments of the present invention, more robust differential signals in various circuits may be achieved. In the telecommunications arena, embodiments of the present invention may be utilized to maintain signal integrity of the tip and ring signals of a communications system. Embodiments of the present invention may be used to adjust the gains experienced by the tip and ring signals to improve longitudinal balance of a portion of a telecommunications system or on a system-wide level.

Although for illustrative purposes, embodiments of the present invention have been discussed in the context of line card applications, the amplifier arrangements taught by embodiments of the present invention is not limited to line card applications. The concepts taught by embodiments of the present invention may be utilized in a variety of electronic applications. The apparatuses 110, 120, 130 may be integrated in a system capable of transmitting and receiving signals having a voice band and/or a data band. The teachings of the present invention may be implemented in a line card 210 that supports POTS technology, ADSL technology, and/or similar technologies. The teachings of the present invention may also be implemented in various other electronics applications.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   providing a differential signal; and
   performing a calibration of a gain of at least a portion of said differential signal to affect the longitudinal balance associated with said differential signal, performing said calibration comprises:
   receiving a first portion of said differential signal and determining a gain associated with said first portion based upon a first feedback signal relating to said first portion;
   receiving a second portion of said differential signal and determining a gain associated with said second portion based upon a second feedback signal relating to said second portion;
   determining a difference between the respective gains of said first and second portions to determine whether said difference is outside a predetermined range of tolerance; and
   modifying at least one of said gain of said first portion and said gain of said second portion based upon a determination that said difference is outside said predetermined range of tolerance.

2. The method of claim 1, wherein receiving said signal further comprises receiving a telecommunications signal.

3. The method of claim 1, wherein receiving said telecommunications signal further comprises receiving a tip and a ring signal.

4. The method of claim 1, wherein performing said calibration further comprises
   determining a gain of said tip signal forward path;
   determining a gain of said ring signal forward path;
   determining a difference in gain between said gain of said tip signal forward path and said gain of said ring signal forward path; and
   modifying at least one of a gain of a signal associated with said tip signal forward path and a gain of a signal associated with said ring signal forward path.

5. The method of claim 4, further comprising modifying said signal associated with said tip signal forward path and said gain of a signal associated with said ring signal forward path.

6. The method of claim 1, wherein determining a difference between the respective gains of said first and second portions further comprises applying a test load to an output associated with said first portion.

7. The method of claim 1, wherein applying said test load further comprises applying a resistive load.

8. An apparatus, comprising:
   means for providing a differential signal; and means for calibrating a gain of at least a portion of said differential signal to affect a longitudinal balance associated with said differential signal, means for performing said calibration comprises:
  means for receiving a first portion of said differential signal and determining a gain associated with said first portion based upon a first feedback signal relating to said first portion;
  means for receiving a second portion of said differential signal and determining a gain associated with said second portion based upon a second feedback signal relating to said second portion;
  means for determining a difference between the respective gains of said first and second portions to determine whether said difference is outside a predetermined range of tolerance; and
  means for modifying at least one of said gain of said first portion and said gain of said second portion based upon a determination that said difference is outside said predetermined range of tolerance.

9. An apparatus, comprising:
a first amplifier to receive a first portion of a differential signal and a second amplifier to receive a second portion of said differential signal to generate a differential output signal; and
a calibration unit to determine a difference between the gain of said first portion of said differential output signal and a second portion of said differential output signal and to adjust at least one of a gain associated with said first portion of said differential output signal and a gain associated with said second portion of said differential output signal based upon said difference to affect a longitudinal balance.

10. The apparatus of claim 9, wherein differential signal is a telecommunications signal.

11. The apparatus of claim 9, wherein said first portion of said differential signal is a tip signal and said second portion of said differential signal is a ring signal.

12. The apparatus of claim 9, further comprising:
a third amplifier to provide said gain associated with said first portion of said differential output signal;
a fourth amplifier to provide said gain associated with said second portion of said differential output signal;
a first current source electrically coupled to said third amplifier and to said calibration unit, said calibration to control said gain associated with said first portion of said differential output signal by controlling said first current source; and
a second current source electrically coupled to said fourth amplifier and to said calibration unit, said calibration to control said gain associated with said second portion of said differential output signal by controlling said second current source.

13. The apparatus of claim 9, wherein said third amplifier, fourth amplifier, first current source, second current source, and said calibration unit are housed in a subscriber line interface circuit (SLIC).

14. The apparatus of claim 13, further comprising a test load electrically coupled with an output terminal of a switch.

15. The apparatus of claim 14, wherein a first input terminal of said switch is electrically coupled to said first amplifier, wherein said switch is capable of coupling the output of said first amplifier to said test load.

16. The apparatus of claim 14, wherein a second input terminal of said switch is electrically coupled to said second amplifier, wherein said switch is capable of coupling the output of said second amplifier to said test load.

17. The apparatus of claim 14, wherein first amplifier, second amplifier, and said switch are housed in a subscriber line audio-processing circuit (SLAC).

18. The apparatus of claim 14, wherein said SLIC and said SLAC are housed on a single integrated circuit chip.

19. The apparatus of claim 14, wherein said SLIC is housed on a first integrated circuit chip and said SLAC is housed on a second integrated circuit chip.

20. A system, comprising:
a subscriber line; and
a line card electronically coupled with said subscriber line, said line card to:
  provide a differential signal;
  perform a calibration of a gain of at least a portion of said differential signal to affect the longitudinal balance associated with said differential signal, to perform the calibration, the line card to:
    receive a first portion of said differential signal and determining a gain associated with said first portion based upon a first feedback signal relating to said first portion;
    receive a second portion of said differential signal and determining a gain associated with said second portion based upon a second feedback signal relating to said second portion;
    determine a difference between the respective gains of said first and second portions to determine whether said difference is outside a predetermined range of tolerance; and
    modify at least of said gain of said first portion and said gain of said second portion based upon a determination that said difference is difference is outside said predetermined range of tolerance.

21. The system of claim 20, further comprising:
a first amplifier to buffer a first portion of said differential signal and a second amplifier to buffer a second portion of said differential signal to generate a differential output signal; and
a calibration unit to determine a difference between the gain of said first portion of said differential output signal and a second portion of said differential output signal and to adjust at least one of a gain associated with said first portion of said differential output signal and a gain associated with said second portion of said differential output signal based upon said difference.

22. The system of claim 21, wherein differential signal is a telecommunications signal.

23. The system of claim 21, wherein said first portion of said differential signal is a tip signal and said second portion of said differential signal is a ring signal.

24. The system of claim 21, further comprising:
a third amplifier to provide said gain associated with said first portion of said differential output signal;
a fourth amplifier to provide said gain associated with said second portion of said differential output signal;
a first current source electrically coupled to said third amplifier and to said calibration unit, said calibration to control said gain associated with said first portion of said differential output signal by controlling said first current source; and
a second current source electrically coupled to said fourth amplifier and to said calibration unit, said calibration to control said gain associated with said second portion of said differential output signal by controlling said second current source.

25. The system of claim 21, wherein said third amplifier, fourth amplifier, first current source, second current source, and said calibration unit are housed in a subscriber line interface circuit (SLIC).

26. The system of claim 25, further comprising a test load electrically coupled with an output terminal of a switch.

27. The system of claim 26, wherein a first input terminal of said switch is electrically coupled to said first amplifier, wherein said switch is capable of coupling the output of said first amplifier to said test load.

28. The system of claim 26, wherein a second input terminal of said switch is electrically coupled to said second amplifier, wherein said switch is capable of coupling the output of said second amplifier to said test load.

29. The system of claim 26, wherein first amplifier, second amplifier, and said switch are housed in a subscriber line audio-processing circuit (SLAC).

30. The system of claim 26, wherein said SLIC and said SLAC are housed within said line card.

* * * * *